United States Patent
Chen et al.

(10) Patent No.: US 8,833,973 B2
(45) Date of Patent: Sep. 16, 2014

(54) LAMP POSITION ADJUSTMENT DEVICE

(75) Inventors: Jung-Chi Chen, Hsinchu (TW); Jih-Ching Chang, Hsinchu (TW); Chih-Hui Chang, Hsinchu (TW)

(73) Assignee: Coretronic Corporation, Hsin-chu (TW)

( * ) Notice: Subject to any disclaimer, the term of this patent is extended or adjusted under 35 U.S.C. 154(b) by 1127 days.

(21) Appl. No.: 12/579,974

(22) Filed: Oct. 15, 2009

(65) Prior Publication Data

US 2010/0097816 A1  Apr. 22, 2010

(30) Foreign Application Priority Data

Oct. 22, 2008  (TW) .............................. 097140387 A (51) Int. Cl.
*F21V 19/02* (2006.01)
*H04N 9/31* (2006.01)
*G03B 21/20* (2006.01)

(52) U.S. Cl.
CPC ............... *H04N 9/315* (2013.01); *H04N 9/317* (2013.01); *H04N 9/3197* (2013.01); *G03B 21/2046* (2013.01)
USPC ........... 362/285; 362/385; 362/418; 362/277; 362/319; 362/321

(58) Field of Classification Search
USPC ......... 362/285, 385, 418, 277, 319, 280, 282, 362/321–324
See application file for complete search history.

(56) References Cited

U.S. PATENT DOCUMENTS

| | | | |
|---|---|---|---|
| 6,909,558 B2 * | 6/2005 | Orimo et al. | 359/694 |
| 7,484,866 B1 * | 2/2009 | Buse | 362/285 |
| 7,517,119 B2 * | 4/2009 | Kaeser et al. | 362/427 |
| 2004/0165386 A1 * | 8/2004 | Lee et al. | 362/285 |
| 2006/0152930 A1 * | 7/2006 | Lin et al. | 362/285 |
| 2006/0158884 A1 * | 7/2006 | Kim | 362/269 |
| 2007/0109799 A1 | 5/2007 | Kaeser et al. | |

FOREIGN PATENT DOCUMENTS

| | | |
|---|---|---|
| TW | 547674 | 8/2003 |
| TW | M275434 | 9/2005 |
| TW | I281594 | 5/2007 |

* cited by examiner

*Primary Examiner* — Diane Lee
*Assistant Examiner* — Jessica M Apenteng
(74) *Attorney, Agent, or Firm* — Muncy, Geissler, Olds & Lowe, P.C.

(57) ABSTRACT

A lamp position adjustment device includes a base plate, a supporting frame, a lamp holder, a first positioning mechanism, and a second positioning mechanism. The first positioning mechanism is disposed between the lamp holder and the supporting frame and between the lamp holder and the base plate to enable the lamp holder to move in a first direction relative to the supporting frame. The first direction is substantially parallel with one side of a light incident surface of an integration rod. The second positioning mechanism is disposed between the lamp holder and the base plate to enable the lamp holder to rotate about an axis parallel to the first direction.

13 Claims, 6 Drawing Sheets

LAMP POSITION ADJUSTMENT DEVICE

CROSS REFERENCE TO RELATED APPLICATION

This application claims priority of application No. 097140387 filed in Taiwan R.O.C on Oct. 22, 2008 under 35 U.S.C. §119; the entire contents of which are hereby incorporated by reference.

BACKGROUND OF THE INVENTION

1. Field of the Invention

The invention relates to a position adjustment device, and more particularly, to a lamp position adjustment device of a projector.

2. Description of the Related Art

Figure 1:
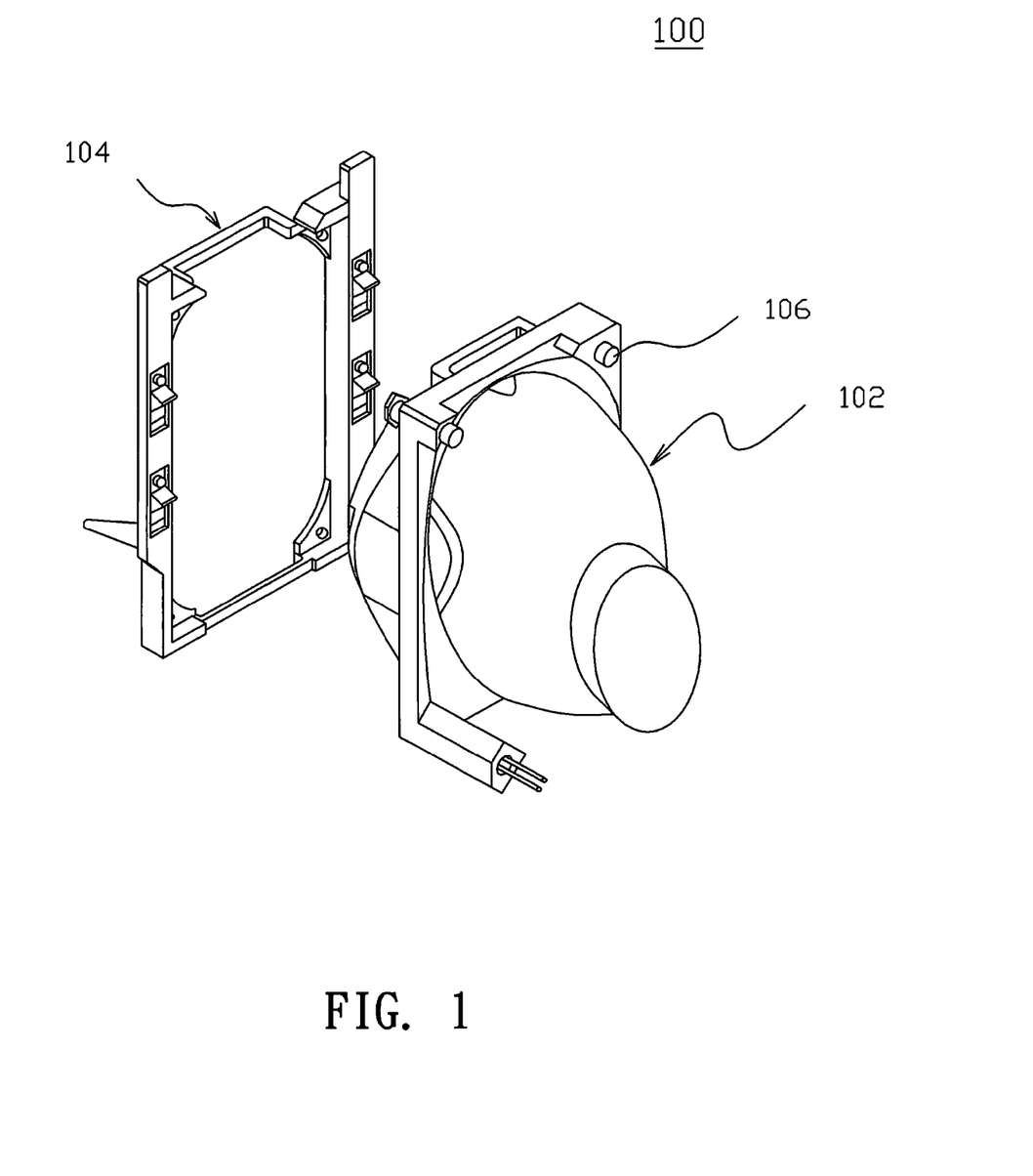
FIG. 1 shows a schematic diagram illustrating a conventional lamp module used in a projector.

FIG. 1 shows a schematic diagram illustrating a conventional lamp module 100 used in a projector. The lamp module 100 includes a lamp 102 and a lamp holder 104 attached to a front end of the lamp 102, where the lamp 102 screws on the lamp holder 104 through screws 106. Typically, the brightest point of a lamp lies in the tip of a lamp wick. Hence, optimum brightness for a projected image is obtained when the position of the lamp 12 in space is optimized. However, manufacturing tolerances exist in the fabrication of each lamp. As shown in FIG. 1, once the lamp module 100 is installed on a projector (not shown) and fails to provide optimum brightness as a result of inferior positioning, the lamp module 100 needs to be re-installed to cure such deficiency, and the re-installation is inconvenient and time-consuming. Further, according to the conventional design, the lamp position fails to be adjusted independently in a selected direction, so an accurate position adjustment to correct manufacturing errors in each lamp is hardly achieved. This results in inferior output brightness of a projector.

BRIEF SUMMARY OF THE INVENTION

The invention relates to a lamp position adjustment device having simple positioning mechanisms to adjust the position of a lamp in two separate directions.

According to an embodiment of the invention, a lamp position adjustment device is used to shift a wick of a lamp to a position corresponding to a center of an integration rod. The lamp position adjustment device includes a base plate, a supporting frame, a lamp holder, a first positioning mechanism, and a second positioning mechanism. The supporting frame is fixed on the base plate, and the lamp holder is disposed in the supporting frame, presses against the supporting frame, and holds the lamp. The first positioning mechanism is disposed between the lamp holder and the supporting frame and between the lamp holder and the base plate to enable the lamp holder to move in a first direction relative to the supporting frame. The first direction is substantially parallel with one side of a light incident surface of the integration rod. The second positioning mechanism is disposed between the lamp holder and the base plate to enable the lamp holder to rotate about an axis parallel to the first direction.

In one embodiment, the first positioning mechanism includes an adjustment screw, a first spring, and a guide screw. The adjustment screw passes through the base plate to press against the lamp holder. The first spring is disposed between the supporting frame and the lamp holder and positioned opposite the adjustment screw for exerting an elastic force in the first direction on the lamp holder. The guide screw passes through the supporting frame and the lamp holder and is inserted into the first spring.

In one embodiment, the second positioning mechanism includes a guide slot formed on the lamp holder and a biased protrusion structure with a protrusion. The protrusion is inserted into the guide slot to force the lamp holder to rotate about the axis parallel to the first direction when the biased protrusion structure rotates. Besides, the second positioning mechanism may further include a pressing plate and a fixed spring. The pressing plate presses against the bottom of the biased protrusion structure to prevent the biased protrusion structure from slipping off the base plate. The fixed spring is disposed between the biased protrusion structure and the pressing plate to increase the friction between the biased protrusion structure and the pressing plate.

In one embodiment, the supporting frame is provided with at least one first fastening hole, the base plate is provided with at least one second fastening hole, and the position of the at least one second fastening hole corresponds to the position of the at least one first fastening hole. The lamp position adjustment device further includes at least one first fastening screw inserted into the at least one first fastening hole and the at least one second fastening hole to fix the supporting frame on the base plate. The lamp holder is provided with at least one third fastening hole, the base plate is provided with at least one fourth fastening hole, and the position of the at least one fourth fastening hole corresponds to the position of the at least one third fastening hole. The lamp position adjustment device further includes at least one second fastening screw inserted into the at least one third fastening hole and the at least one fourth fastening hole to fix the lamp holder on the base plate.

According to the above embodiment or the above embodiments, the position of a lamp may be adjusted in two separate directions by simple positioning mechanisms. Hence, no matter which position the lamp wick locates in space, optimum projection brightness is obtained simply by adjusting the position once along a first direction and further adjusting the position once along a second direction. Thereby, the lamp positioning process is simplified, the consumption of time of the lamp positioning process is reduced, and high positioning accuracy is also achieved.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
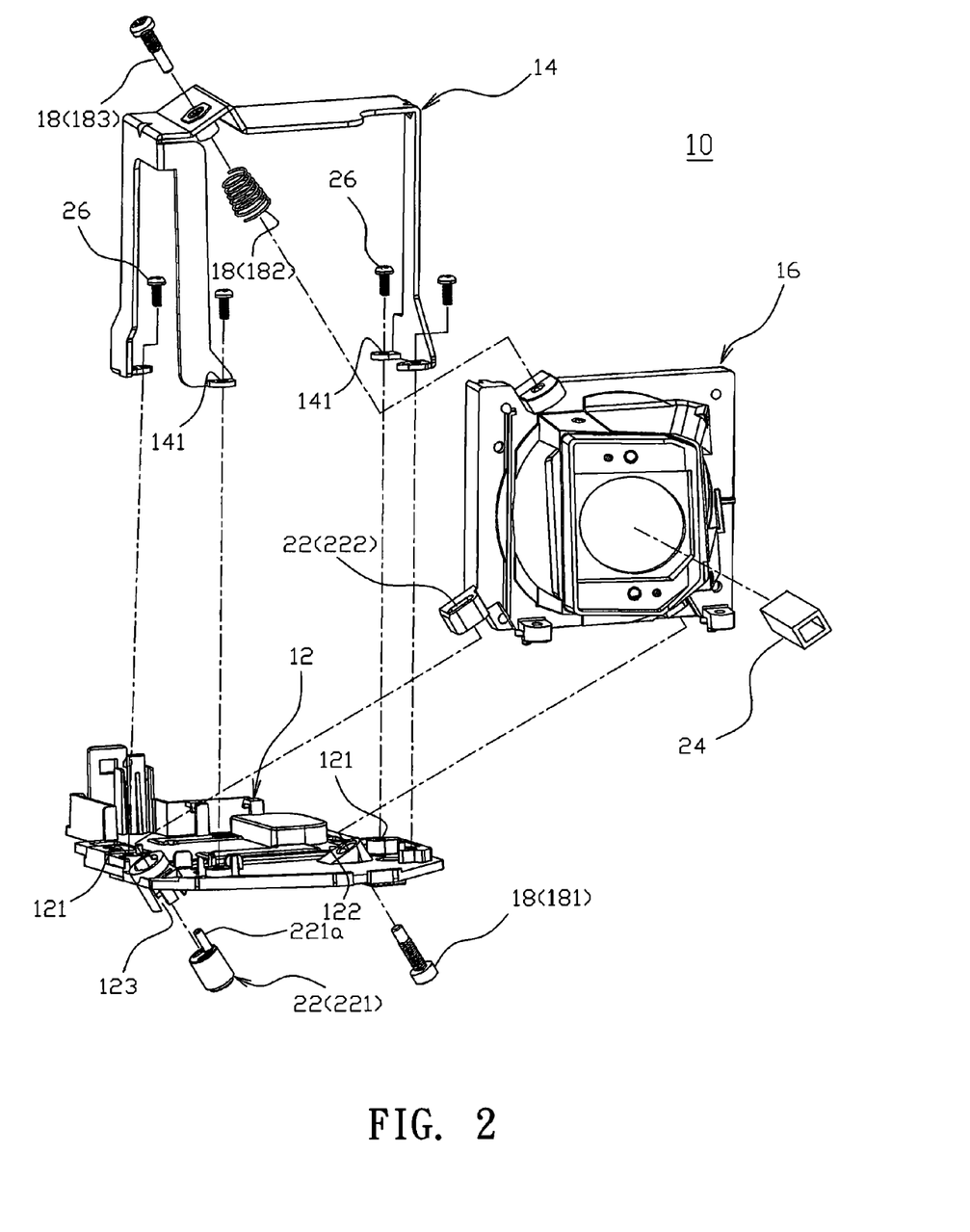
FIG. 2 shows an exploded view of a lamp position adjustment device according to an embodiment of the invention.
Figure 3:
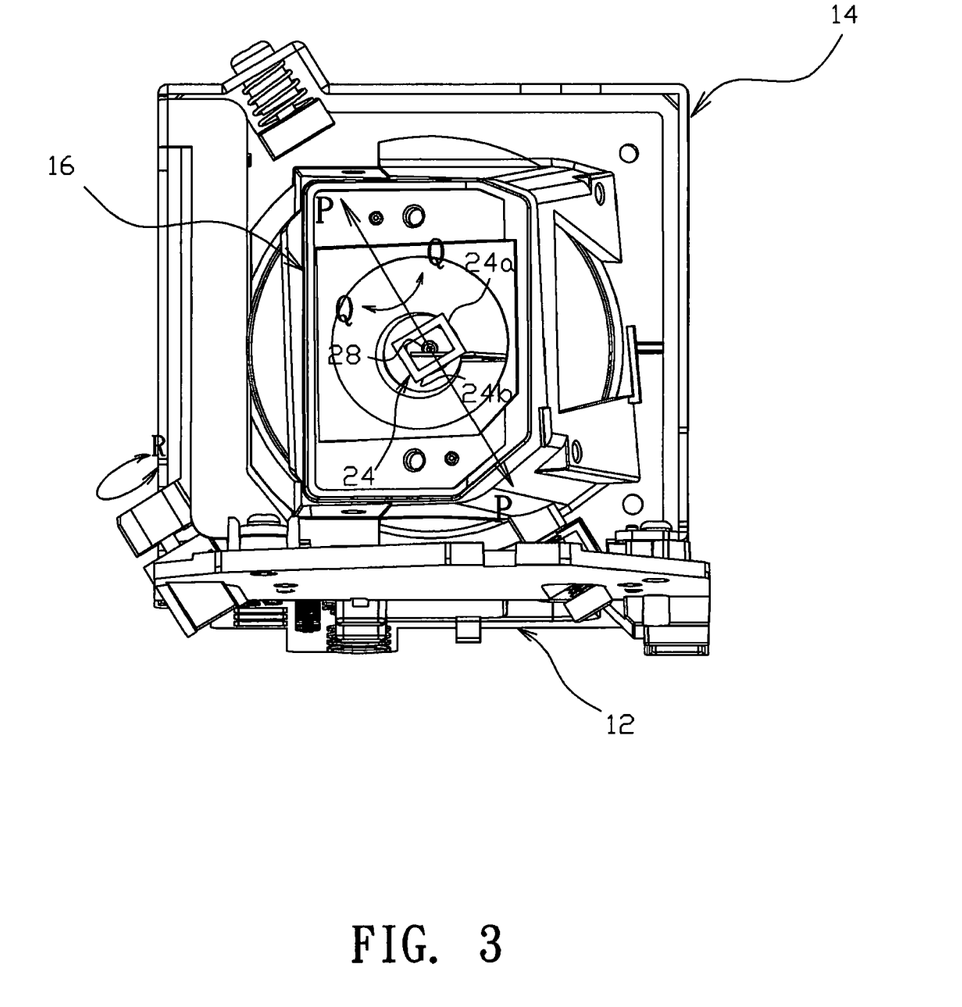
FIG. 3 shows a schematic diagram illustrating an assembled lamp position adjustment device according to an embodiment of the invention.

Referring to FIG. 2, the lamp position adjustment device 10 includes a base plate 12, a supporting frame 14, a lamp holder 16, a first positioning mechanism 18, and a second positioning mechanism 22. The lamp position adjustment device 10 is used for shifting a lamp wick (not shown) to a position corresponding to a center of an integration rod 24 to provide optimum projection brightness. In this embodiment, the supporting frame 14 is provided with at least one first screw hole 141, the base plate 12 is provided with at least one second screw hole 121, and the position of the at least one first screw hole 141 is corresponding to the position of the at least one second screw hole 121. For example, four first fastening screws 26 shown in FIG. 2 are inserted into the first screw holes 141 and the second screw holes 121 to fix the supporting frame 14 on the base plate 12. The lamp holder 16 is disposed in the supporting frame 14 and presses against the supporting frame 14, and the lamp holder 16 holds a lamp (not shown). The first positioning mechanism 18 is disposed between the lamp holder 16 and the supporting frame 14 and between the lamp holder 16 and the base plate 12. In this embodiment, the first positioning mechanism 18 includes an adjustment screw 181, a compression spring 182, and a guide screw 183. The adjustment screw 181 passes through a first through hole 122 on the base plate 12 to press against a corner of the lamp holder 16. The compression spring 182 is disposed between the supporting frame 14 and the lamp holder 16 and is positioned opposite the adjustment screw 181. In this embodiment, the adjustment screw 181 and the compression spring 182 are respectively positioned at two ends of a diagonal line of the lamp holder 16. After the adjustment screw 181 passes through the base plate 12, the adjustment screw 181 is continually tightened inwardly to force the lamp holder 16 to move towards the upper left and to compress the compression spring 182. In comparison, when the adjustment screw 181 is loosened outwardly, the compression spring 182 exerts an elastic force on the lamp holder 16 to force the lamp holder 16 to move towards the lower right. The guide screw 183 positioned opposite the adjustment screw 181 passes through the supporting frame 14 and the lamp holder 16 and is inserted into the compression spring 182 to hold the compression spring 182 and to ensure the position adjusting direction of the first positioning mechanism 18. Hence, according to the diagonal arrangement of the adjustment screw 181 and the compression spring 182 (together with the guide screw 183) in the first positioning mechanism 18, the lamp holder 16 is allowed to move in a first direction P (shown in FIG. 3) relative to the supporting frame 14 when the adjustment screw 181 is tightened or loosened. Specifically, the first direction P is substantially parallel with a connecting line of the adjustment screw 181 and the guide screw 183. In one embodiment, the first direction P is substantially parallel with one side 24a of a light incident surface of the integration rod 24.

Figure 4A:
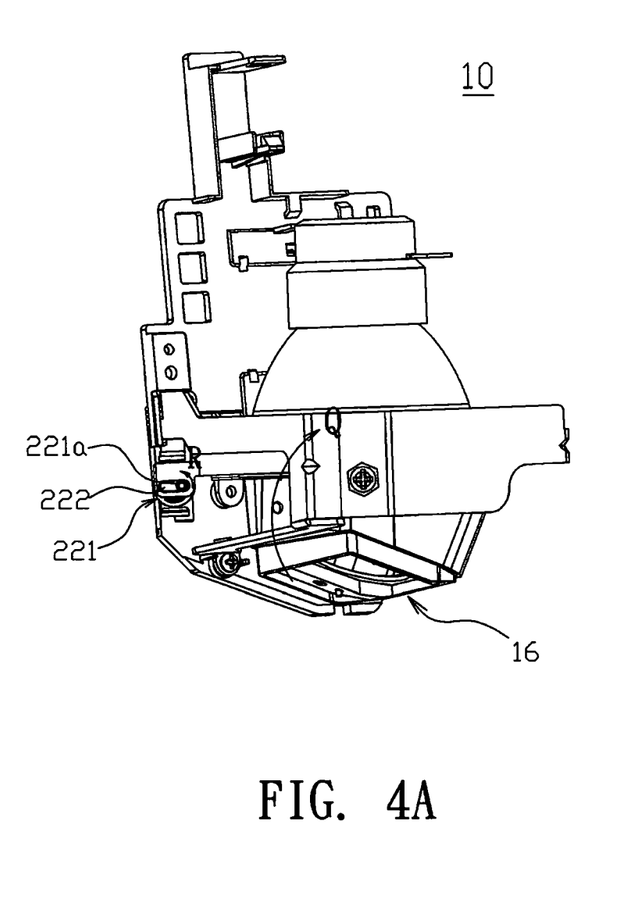
FIG. 4A and FIG. 4B show a schematic diagram illustrating the function of a based protrusion structure.
Figure 4B:
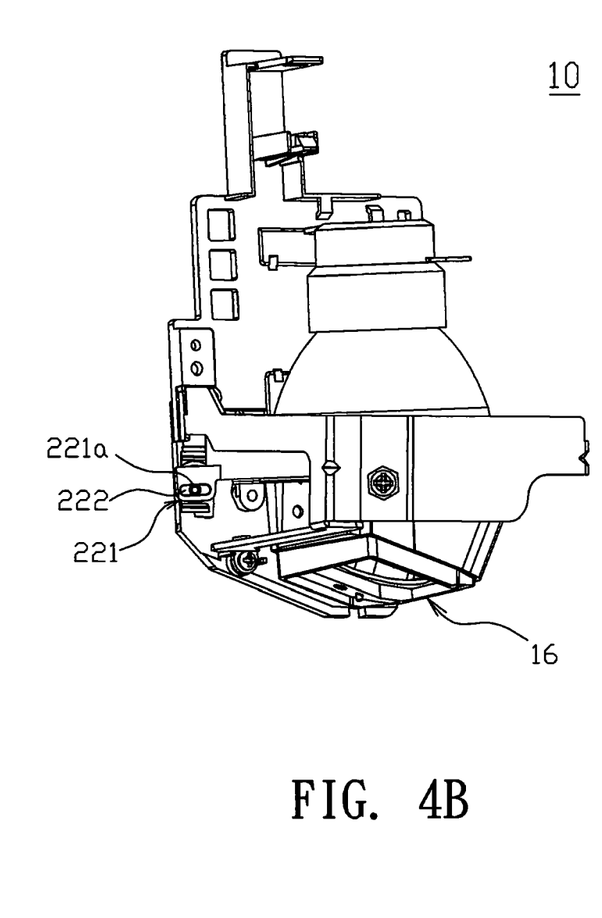

The second positioning mechanism 22 includes a biased protrusion structure 221 and a guide slot 222. The guide slot 222 is formed on a corner of the lamp holder 16 and substantially positioned at one end of a diagonal line of the lamp holder 16. A second through hole 123 is formed on the base plate 12 at a position corresponding to the guide slot 222, and the biased protrusion structure 221 has a protrusion 221a. During assembly, after the biased protrusion structure 221 is inserted into the second through hole 123 on the base plate 12, the protrusion 221a is inserted into the guide slot 222 of the lamp holder 16 to force the lamp holder 16 to rotate as the biased protrusion structure 221 rotates. For example, when the biased protrusion structure 221 counterclockwise rotates along a rotation direction R shown in FIG. 3, the protrusion 221a is shifted from one side (FIG. 4A) to the center (FIG. 4B) of the guide slot 222 to force the lamp holder 16 to clockwise rotate along a rotation direction Q. Referring to FIG. 3 again, the first positioning mechanism 18 allows the lamp holder 16 to move in the first direction P parallel with one side 24a of a light incident surface of the integration rod 24. Besides, the second positioning mechanism 22 allows the lamp holder 16 to rotate along a rotation direction Q about an axis parallel to the first direction P, and thus a lamp wick 28 of the lamp is allowed to move in a direction substantially parallel with another side 24b of the light incident surface of the integration rod 24. Under the circumstance, the lamp wick 28 is allowed to move to a position corresponding to a center of the integration rod 24 quickly, as long as the position along the first direction P and the position along the rotation direction Q are each adjusted once.

Figure 5:
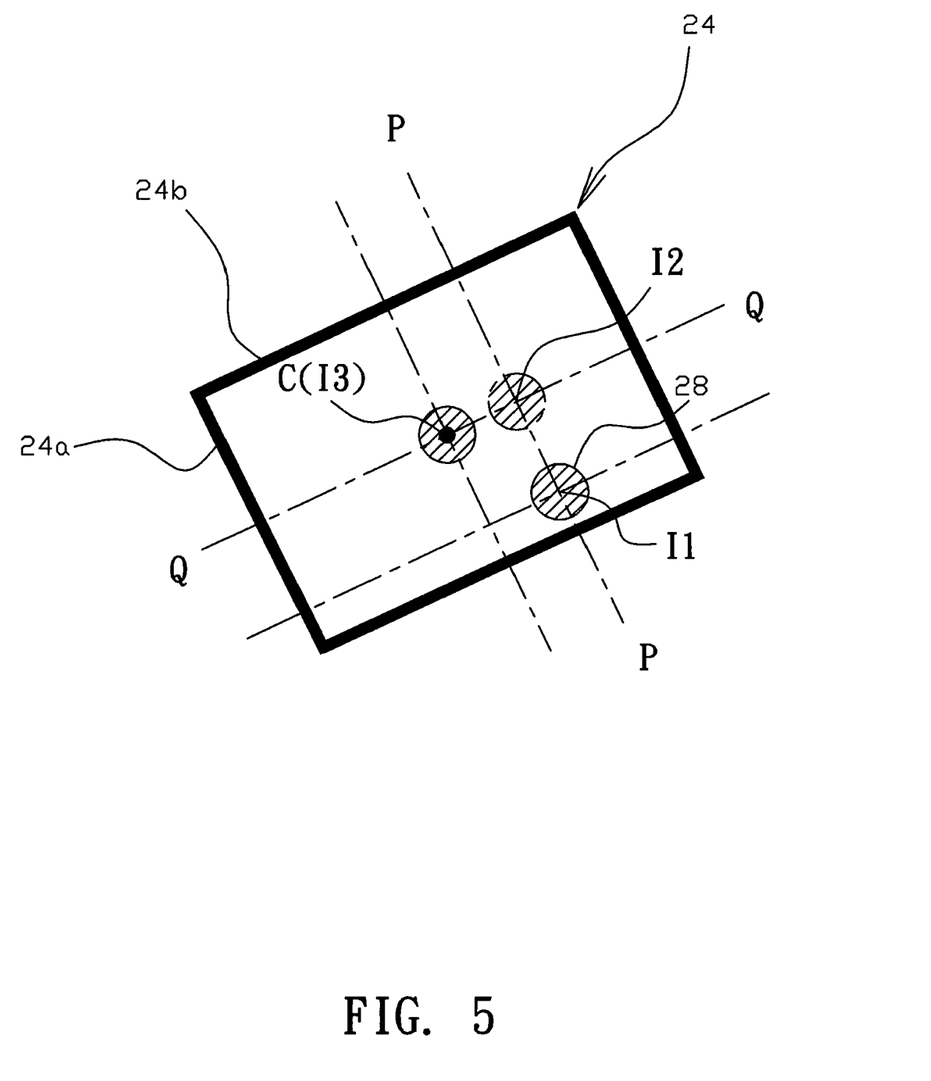
FIG. 5 shows a schematic diagram illustrating the positioning process of a lamp according to an embodiment of the invention.

Referring to FIG. 5, a rectangular black frame indicates a light incident surface of the integration rod 24, the light incident surface has a first side 24a and a second side 24b perpendicular to each other, and a hatched circle indicates the position of the lamp wick 28. In the positioning process, the lamp wick 28 is shifted from an initial position I1 to a target position I3 corresponding to a center C of the integration rod 24. According to this embodiment, since the first direction P of the lamp holder 16 is substantially parallel with one side 24a of the light incident surface of the integration rod 24, only two steps are needed to let the lamp wick 28 approach the center C of the integration rod 24. In the first step, the lamp wick 28 in an initial position (such as position I1) is shifted in the first direction P by the first positioning mechanism 18 to a position I2 corresponding to an intersection of the first direction P and the rotation direction Q. In the second step, the lamp holder 16 rotates along the rotation direction Q about the axis parallel to the first direction P by the second positioning mechanism 22, so the lamp wick 28 in the position I2 corresponding to the intersection is shifted to a target position I3 corresponding to the center C of the integration rod 24. Hence, no matter which position the lamp wick 28 locates, optimum projection brightness is obtained simply by adjusting the position once along the first direction P and further adjusting the position once along the rotation direction Q. Hence, the lamp positioning process is simplified, consumption of time of the lamp positioning process is reduced, and high positioning accuracy is also achieved.

Figure 6:
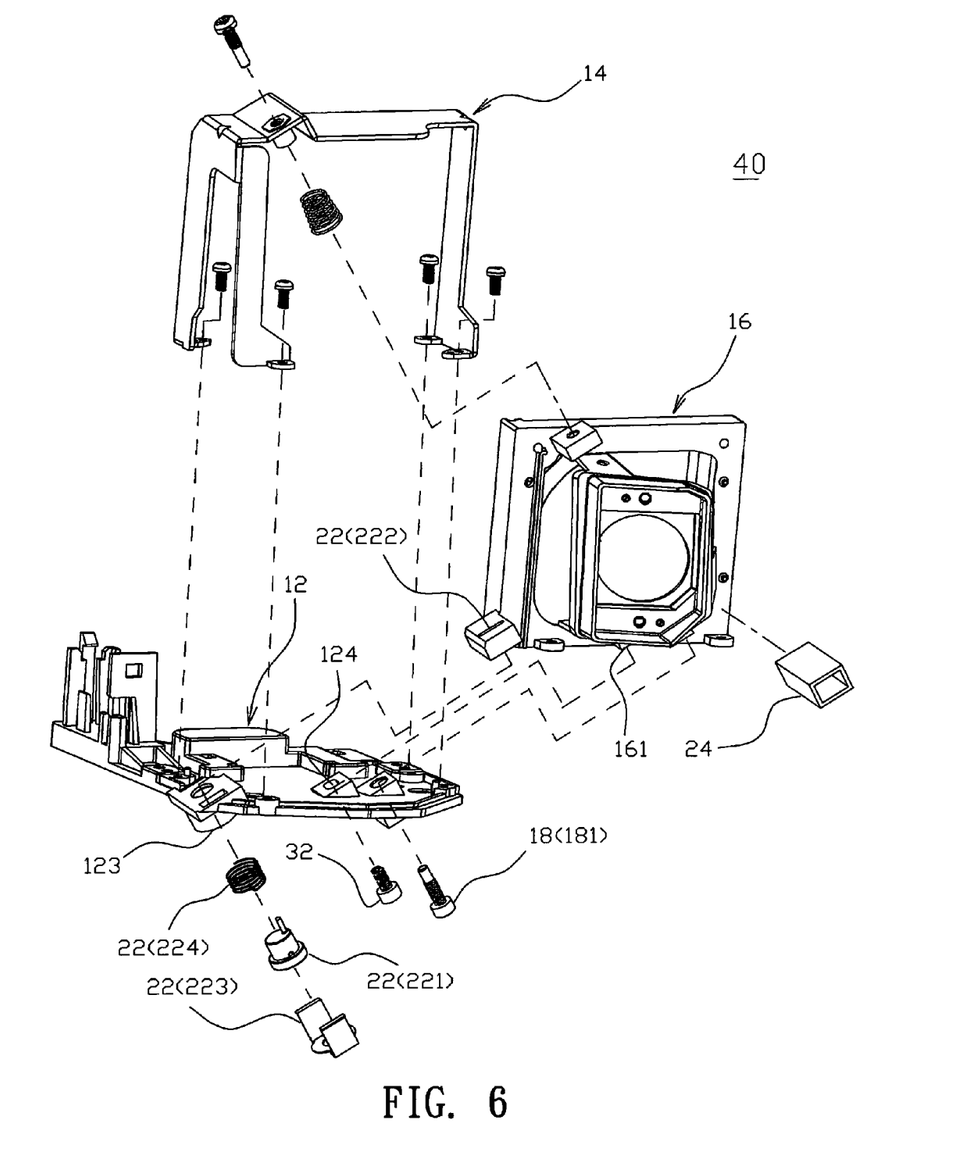
FIG. 6 shows an exploded view of a lamp position adjustment device according to another embodiment of the invention.

Referring to FIG. 6, the embodiment shown in FIG. 6 is similar to the embodiment shown in FIG. 2, except the second positioning mechanism 22 further includes a pressing plate 223 and a fixed spring 224. In this embodiment, the pressing plate 223 has a U-shaped cross-section, and the pressing plate 223 presses against the bottom of the biased protrusion structure 221 and is inserted into the second through hole 123 to prevent the biased protrusion structure 221 from slipping off the base plate 12. The fixed spring 224 is disposed between the biased protrusion structure 221 and the pressing plate 223 to increase the friction between the biased protrusion structure 221 and the pressing plate 223. The fixed spring 224 may avoid bad influences on the positioning accuracy in case the biased protrusion structure 221 vibrates as external forces being applied on the biased protrusion structure 221. Besides, in this embodiment, the lamp holder 16 is provided with at least one third screw hole 161, and the base plate 12 is provided with at least one fourth screw hole 124, the position of the at least one fourth screw hole 124 corresponds to the position of the at least one third screw hole 161. In one embodiment, after the position adjusting process is done by the first positioning mechanism 18 and the second positioning mechanism 22, a second fastening screw 32 is inserted into the third screw hole 161 and the fourth screw hole 124 to fix the lamp holder 16 on the base plate 12.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lamp position adjustment device used for shifting a wick of a lamp to a position corresponding to a center of an integration rod, the lamp position adjustment device comprising:
   a base plate;
   a supporting frame fixed on the base plate;
   a lamp holder, disposed in the supporting frame, pressing against the supporting frame, and holding the lamp;
   a first positioning mechanism disposed between the lamp holder and the supporting frame and between the lamp holder and the base plate to enable the lamp holder to move in a first direction relative to the supporting frame, wherein the first direction is substantially parallel with one side of a light incident surface of the integration rod, and the first positioning mechanism comprises:
   an adjustment screw passing through the base plate to press against the lamp holder; and
   a first spring disposed between the supporting frame and the lamp holder and positioned opposite the adjustment screw for exerting an elastic force in the first direction on the lamp holder, wherein the base plate has a first through hole, the adjustment screw is capable of passing through the first through hole to press against a corner of the lamp holder, and the adjustment screw and the first spring are respectively positioned at two ends of a diagonal line of the lamp holder; and
   a second positioning mechanism disposed between the lamp holder and the base plate to enable the lamp holder to rotate about an axis parallel to the first direction, wherein the second positioning mechanism comprises:
   a guide slot formed on the lamp holder; and
   a biased protrusion structure having a protrusion, wherein the protrusion is inserted into the guide slot to force the lamp holder to rotate about the axis parallel to the first direction when the biased protrusion structure rotates.

2. The lamp position adjustment device as claimed in claim 1, wherein the first spring comprises a compression spring.

3. The lamp position adjustment device as claimed in claim 1, further comprising a guide screw passing through the supporting frame and the lamp holder and inserted into the first spring.

4. The lamp position adjustment device as claimed in claim 3, wherein a connecting line of the adjustment screw and the guide screw is substantially parallel with the first direction.

5. The lamp position adjustment device as claimed in claim 1, wherein the guide slot is formed on a corner of the lamp holder.

6. The lamp position adjustment device as claimed in claim 1, wherein the guide slot is positioned at one end of a diagonal line of the lamp holder.

7. The lamp position adjustment device as claimed in claim 1, wherein a second through hole is formed on the base plate at a position corresponding to the guide slot, and the biased protrusion structure is inserted into the second through hole.

8. The lamp position adjustment device as claimed in claim 1, wherein the second positioning mechanism further comprising:
   a pressing plate pressing against the biased protrusion structure; and
   a second spring disposed between the pressing plate and the biased protrusion structure.

9. The lamp position adjustment device as claimed in claim 8, wherein a second through hole is formed on the base plate at a position corresponding to the guide slot, and the pressing plate is inserted into the second through hole to fix the biased protrusion structure and the second spring on the base plate.

10. The lamp position adjustment device as claimed in claim 8, wherein the pressing plate has a U-shaped cross-section.

11. The lamp position adjustment device as claimed in claim 1, wherein the supporting frame is provided with at least one first fastening hole, the base plate is provided with at least one second fastening hole, the position of the at least one second fastening hole corresponds to the position of the at least one first fastening hole, and the lamp position adjustment device further comprises at least one first fastening screw inserted into the at least one first fastening hole and the at least one second fastening hole to fix the supporting frame on the base plate.

12. The lamp position adjustment device as claimed in claim 1, wherein the lamp holder is provided with at least one third fastening hole, the base plate is provided with at least one fourth fastening hole, the position of the at least one fourth fastening hole corresponds to the position of the at least one third fastening hole, and the lamp position adjustment device further comprises at least one second fastening screw inserted into the at least one third fastening hole and the at least one fourth fastening hole to fix the lamp holder on the base plate.

13. The lamp position adjustment device as claimed in claim 1, wherein the light incident surface of the integration rod has a first side and a second side perpendicular to each other, and the first direction is parallel with the first side or the second side.

* * * * *